H. H. Elwell.

Reversible Knob-Latch.

No. 3,909. Reissued Apr. 5, 1870.

Witnesses:
J. W. Coombs
G. W. Reed

Inventor:
H. H. Elwell
per Munn & Co
attorneys

N. PETERS, PHOTO-LITHOGRAPHER, WASHINGTON, D. C.

United States Patent Office.

THE NORWALK LOCK COMPANY, OF SOUTH NORWALK, CONNECTICUT, ASSIGNEES OF HENRY H. ELWELL.

*Letters Patent No.* 39,280, *dated July* 21, 1863; *reissue No.* 3,909, *dated April* 5, 1870.

IMPROVEMENT IN REVERSIBLE KNOB-LATCHES.

The Schedule referred to in these Letters Patent and making part of the same.

*To all whom it may concern:*

Be it known that HENRY H. ELWELL, of South Norwalk, in the county of Fairfield and State of Connecticut, did invent a new Improvement in Locks; and we do hereby declare the following, when taken in connection with the accompanying drawings and the letters of reference marked thereon, to be a full, clear, and exact description of the same, and which said drawings constitute part of this specification, and represent in—

Figure 1:
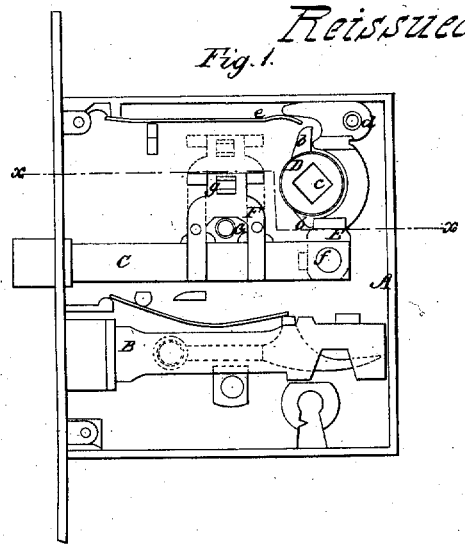
Figure 2:
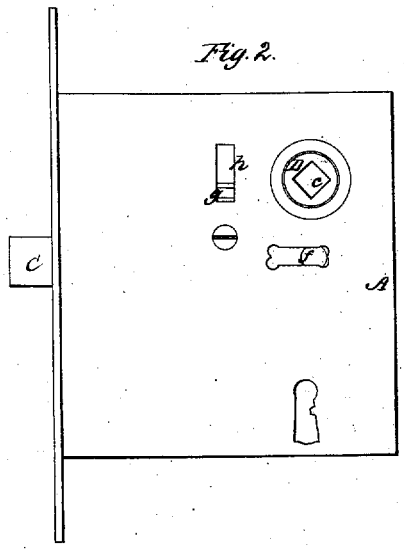

Figure 1, an internal view of a lock with this improvement applied to it;

Figure 2, an external view of the same; and in

Figure 3:
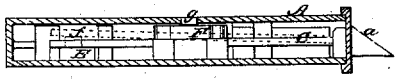

Figure 3, a horizontal section of the same, taken in the line *x x*, fig. 1.

This invention relates to an improvement in that class of locks which is provided with reversible latch-bolts, to enable them to be applied to either a right or left-hand door; and The invention consists in connecting the inner end of the latch-bolt to the lever, through which, by means of the hub, the latch-bolt is actuated by a pin on the lever, and a corresponding perforation in the latch-bolt, so that the latch-bolt may be easily detached or removed from the lever, and secured in position by a movable bearing within the case, to prevent the accidental removal of the latch-bolt from the lever, and yet so that the latch-bolt may be detached from the lever, removed from the case, and replaced in either a right or left-hand position.

A represents the case of the lock, which may be of the usual rectangular form.

B, the bolt, which is operated by a key, as usual.

C is the latch-bolt, which has its outer end beveled at one side in the ordinary way, as shown at *a*, fig. 3.

D is the hub, which is fitted in the case A, and has two arms, *b b*, projecting from it.

The hub D also has a square opening, *c*, made through it, to receive the knob-spindle.

E is a lever, which has its fulcrum at *d*, and its upper end bearing against a spring, *e*.

Thus far the mechanism of the lock is of common construction.

To make this class of latches reversible, the lower end of the lever E has a pin, *f*, projecting from it; and on this pin the inner end of the latch-bolt C is fitted, the pin *f* serving to connect the latch-bolt to the lever, so that the former may be operated or drawn within the case A by turning the knob-spindle, as usual.

To secure the latch-bolt onto the lever, a bearing is formed, which shall so bear against the latch-bolt as to prevent its accidental removal, and yet so that the said bearing may be removed, to permit the removal of the bolt for adjustment; and this is done by means of a slide, F, which is of fork-form, and fitted on a guide, G, within the case A.

This slide is placed in such relation with the latch-bolt that it may be moved over the latch-bolt, as shown in black, fig. 1, and serve to retain the latter in proper position as it is worked out and in, the bearing also capable of being moved upward, as shown in broken lines, fig. 1, so as to be free from the latch-bolt, and admit of the inner end of the latter being detached from the lever, as shown in broken lines, fig. 3, and withdrawn from the case, if necessary, in order to reverse the bevel *a*.

If the inner part of the latch-bolt C be sufficiently narrow, it may be turned without being withdrawn from the case A.

The bearing F may be held up by the operator with one hand, while the other turns the latch, and the bearing will fall by its own gravity when the hand or finger is withdrawn from it.

The bearing is raised by having a projection, *g*, attached to it, which is fitted in a slot, *h*, in the side of the case A, as shown in fig. 2, the projection being notched, to receive the nail of the thumb or any suitable implement.

The bearing may have a spring behind it, if necessary, in order to prevent it from moving too freely.

We are aware that reversible latch-bolts have been arranged by having their inner ends attached to the lower end of the lever E by means of a screw, which requires to be unscrewed in order to release the latch-bolt. This is a troublesome operation, and the screw is liable to be lost; besides, the bolt is liable to work loose on the screw, and the screw also liable to work loose in the lever.

In this improvement, the pin *f* forms a durable connection for the latch-bolt, and, in reversing the latter, no screw nor any other part requires to be removed, the bearing F being simply raised above the latch-bolt, as described.

It will be observed that the object of the slide is simply to hold the bolt in place, and it is believed to be the best method of so doing.

We claim as the invention of the said HENRY H. ELWELL—

The arrangement of the bolt C, attached to the lever E by a fixed pin, *f*, and combined with a movable bearing within the case, whereby the bolt may be secured to or detached from the lever, substantially as set forth.

NORWALK LOCK CO.
E. BEARD, *Secretary.*

Witnesses:
L. S. CURTISS,
DAVID E. DISBROW.